United States Patent [19]

Aldereguia et al.

[11] Patent Number: 5,255,374
[45] Date of Patent: Oct. 19, 1993

[54] BUS INTERFACE LOGIC FOR COMPUTER SYSTEM HAVING DUAL BUS ARCHITECTURE

[75] Inventors: Alfredo Aldereguia; Nader Amini, both of Boca Raton; Richard L. Horne, Boynton Beach; Terence J. Lohman; Cang N. Tran, both of Boca Raton, all of Fla.

[73] Assignee: International Business Machines Corporation, Armonk, N.Y.

[21] Appl. No.: 816,203

[22] Filed: Jan. 2, 1992

[51] Int. Cl.⁵ .............................................. G06F 13/14
[52] U.S. Cl. ............................. 395/325; 364/DIG. 1; 364/239.1; 364/239.7; 364/240.2; 364/240.3; 364/242.92
[58] Field of Search ................ 395/275, 325, 725, 250

[56] References Cited

U.S. PATENT DOCUMENTS

| | | | |
|---|---|---|---|
| 4,371,928 | 2/1983 | Barlow et al. | 395/325 |
| 4,683,534 | 7/1987 | Tietjen et al. | 395/325 |
| 4,703,420 | 10/1987 | Irwin | 395/800 |
| 4,766,538 | 8/1988 | Miyoshi | 395/325 |
| 4,831,520 | 5/1989 | Rubinfeld et al. | 395/325 |
| 5,003,463 | 3/1991 | Coyle et al. | 395/275 |
| 5,003,465 | 3/1991 | Chisholm et al. | 395/275 |
| 5,148,539 | 9/1992 | Enomoto et al. | 395/425 |

*Primary Examiner*—Debra A. Chun
*Attorney, Agent, or Firm*—Stephen A. Terrile; John A. Kastelic

[57] ABSTRACT

A computer system is provided, comprising system memory and a memory controller for controlling access to system memory, a central processing unit electrically connected with the memory controller, and a bus interface unit electrically connected to the memory controller by a system bus and electrically connected to an input/output device by an input/output bus. The bus interface unit includes translation logic for temporarily storing, in response to a predetermined set of operating conditions, data transferred between the system bus and the input/output bus through the bus interface unit. The predetermined set of operating conditions occur when (i) the memory controller on behalf of the central processing unit writes data to the input/output device, or (ii) the memory controller on behalf of the central processing unit initiates a read or write cycle destined for the input/output device acting as a slave on the input/output bus, and the data bus width of the memory controller is greater than a corresponding data bus width of the input/output device.

14 Claims, 6 Drawing Sheets

| TRANSFER SIZE NUMBER OF BYTE(S) | SLAVE DEVICE SIZE | | |
|---|---|---|---|
| | 8-BIT | 16-BIT | 32-BIT |
| 1-BYTE | A | A | A |
| 2-BYTE | A | A | A |
| 3-BYTE | C | B | B |
| 4-BYTE | C | B | B |

A. CYCLE IS POSTED
B. CYCLE IS POSTED IF SLAVE DEVICE HAS A 16 OR 32 BIT DATA BUS WITH.
C. CYCLE IS NOT POSTED

FIG.7

BUS INTERFACE LOGIC FOR COMPUTER SYSTEM HAVING DUAL BUS ARCHITECTURE

RELATED APPLICATIONS

The following U.S. patent applications are incorporated herein by reference as if they had been fully set out:

Application Ser. No. 815992 Filed Jan. 2, 1992 Entitled "BUS CONTROL LOGIC FOR COMPUTER SYSTEM HAVING DUAL BUS ARCHITECTURE" (Further identified as Attorney Docket BC9-91-089)

Application Ser. No. 816116 Filed Jan. 2, 1992 Entitled "ARBITRATION MECHANISM" (Further identified as Attorney Docket BC9-91-090)

Application Ser. No. 816184 Filed Jan. 2, 1992 Entitled "PARITY ERROR DETECTION AND RECOVERY" (Further identified as Attorney Docket BC9-91-091)

Application Ser. No. 816204 Filed Jan. 2, 1992 Entitled "CACHE SNOOPING AND DATA INVALIDATION TECHNIQUE" (Further identified as Attorney Docket BC9-91-092)

Application Ser. No. 816691 Filed Jan. 2, 1992 Entitled "BIDIRECTIONAL DATA STORAGE FACILITY FOR BUS INTERFACE UNIT" (Further identified as Attorney Docket BC9-91-105)

Application Ser. No. 816693 Filed Jan. 2, 1992 Entitled "BUS INTERFACE FOR CONTROLLING SPEED OF BUS OPERATION" (Further identified as Attorney Docket BC9-91-106)

Application Ser. No. 816698 Filed Jan. 2, 1992 Entitled "METHOD AND APPARATUS FOR DETERMINING ADDRESS LOCATION AT BUS TO BUS INTERFACE" (Further identified as Attorney Docket BC9-91-107)

BACKGROUND OF THE INVENTION

The present invention relates to bus to bus interfaces in computer systems, and more particularly to a bus to bus interface for synchronizing operation of buses in the system to compensate for devices which communicate to each other at different rates and over different data transfer bandwidths.

Generally in computer systems and especially in personal computer systems, data is transferred between various system devices such as a central processing unit (CPU), memory devices, and direct memory access (DMA) controllers. In addition, data is transferred between expansion elements such as input/output (I/O) devices, and between these I/O devices and the various system devices. The I/O devices and the system devices communicate with and amongst each other over computer buses, which comprise a series of conductors along which information is transmitted from any of several sources to any of several destinations. Many of the system devices and the I/O devices are capable of serving as bus controllers (i.e., devices which can control the computer system) and bus slaves (i.e., elements which are controlled by bus controllers).

Personal computer systems having more than one bus are known. Typically, a local bus is provided over which the CPU communicates with cache memory or a memory controller, and a system I/O bus is provided over which system bus devices such as the DMA controller, or the I/O devices, communicate with the system memory via the memory controller. The system I/O bus comprises a system bus and an I/O bus connected by a bus interface unit. The I/O devices communicate with one another over the I/O bus. The I/O devices are also typically required to communicate with system bus devices such as system memory. Such communications must travel over both the I/O bus and the system bus through the bus interface unit.

System devices and I/O devices in dual bus architecture computer systems often communicate with each other at different rates and over different data transfer bandwidths. For example, whereas system devices may communicate over the system bus at a 32-bit data bus width, I/O devices may communicate over the I/O bus at 8-bit, 16-bit, or 32-bit data bus widths. Hence, overall system performance suffers when a system device, in control of both the system and I/O buses, either reads from or writes to a slower I/O device. This is compounded by 16-bit transactions to 8-bit I/O slaves and 32-bit transactions to 16-bit and 8-bit I/O slaves. In the case of write cycles, a system device must retain control of the system bus, for a time greater than that necessary to write data over the system bus, while the data is being written to the slower I/O device. In the case of read cycles, the slower I/O device cannot provide data to the system device over the I/O bus as fast as it can be read from the I/O device by the system device.

It is an object of the present invention, then, to provide a bus interface unit in a dual bus architecture computer system which provides the translation logic required for synchronizing operation of the system bus and the I/O bus to compensate for devices which communicate to each other at different rates and over different data transfer bandwidths.

SUMMARY OF THE INVENTION

The present invention provides translation logic for a bus interface unit in a dual architecture computer system. The translation logic is implemented by algorithms which are built into the hardware of the bus interface unit, which resides intermediate a system bus and an I/O bus in the computer system. The translation logic in the bus interface unit improves the performance of the computer system by synchronizing operation of the system bus and the I/O bus. Synchronization of the buses compensates for system bus devices and input/output devices which communicate to each other at different rates and over different data transfer bandwidths.

The translation logic operates under two conditions. The first condition occurs when a fast system device is writing data to a slower I/O device. Because system devices write data over the system bus at faster rates than most I/O devices, the slower I/O devices cannot accept the data as fast as the system device writes it to them. Thus, the present invention provides a buffer wherein data written from the faster system device to the slower I/O device may be temporarily stored. In this manner, write data which has been stored (or posted) in the buffer frees the system bus for subsequent operations even though all of the write data has not yet been written to the I/O device over the I/O bus.

The second condition under which the translation logic operates occurs when a system device in control of the system bus desires to initiate a read or write cycle destined for an I/O device acting as a slave on the I/O bus, and the data bus width of the system device is greater than the data bus width of the I/O device. Typically, the data bus width of the system device is 32-bits, which is supported on both the system bus side and the I/O bus side of the bus interface unit, and the data bus width of the I/O device is 8-bits, 16-bits, or 32-bits. A system device communicating over the system bus to an 8-bit or 16-bit I/O device on the I/O bus must wait for the I/O device to receive a complete read or write request before the system device may relinquish control of the system bus. Hence, data from a 32-bit data bus width system device which is destined to be read by or written to a 8-bit I/O device is temporarily stored in a buffer in the translation logic. The buffer in the preferred embodiment has the capacity to hold thirty-two bits of data and address. The translation logic provides the means to convert single 32-bit read and write cycles initiated on the system bus to four 8-bit or two 16-bit cycles or single 16-bit reads and write cycles to two 8-bit cycles and allows posted write cycles to occur without impeding time critical bus activity, such as refresh.

BRIEF DESCRIPTION OF THE DRAWINGS

FIG. 7 is a table listing the conditions under which to post cycles.

DETAILED DESCRIPTION OF THE PREFERRED EMBODIMENT

Figure 1:
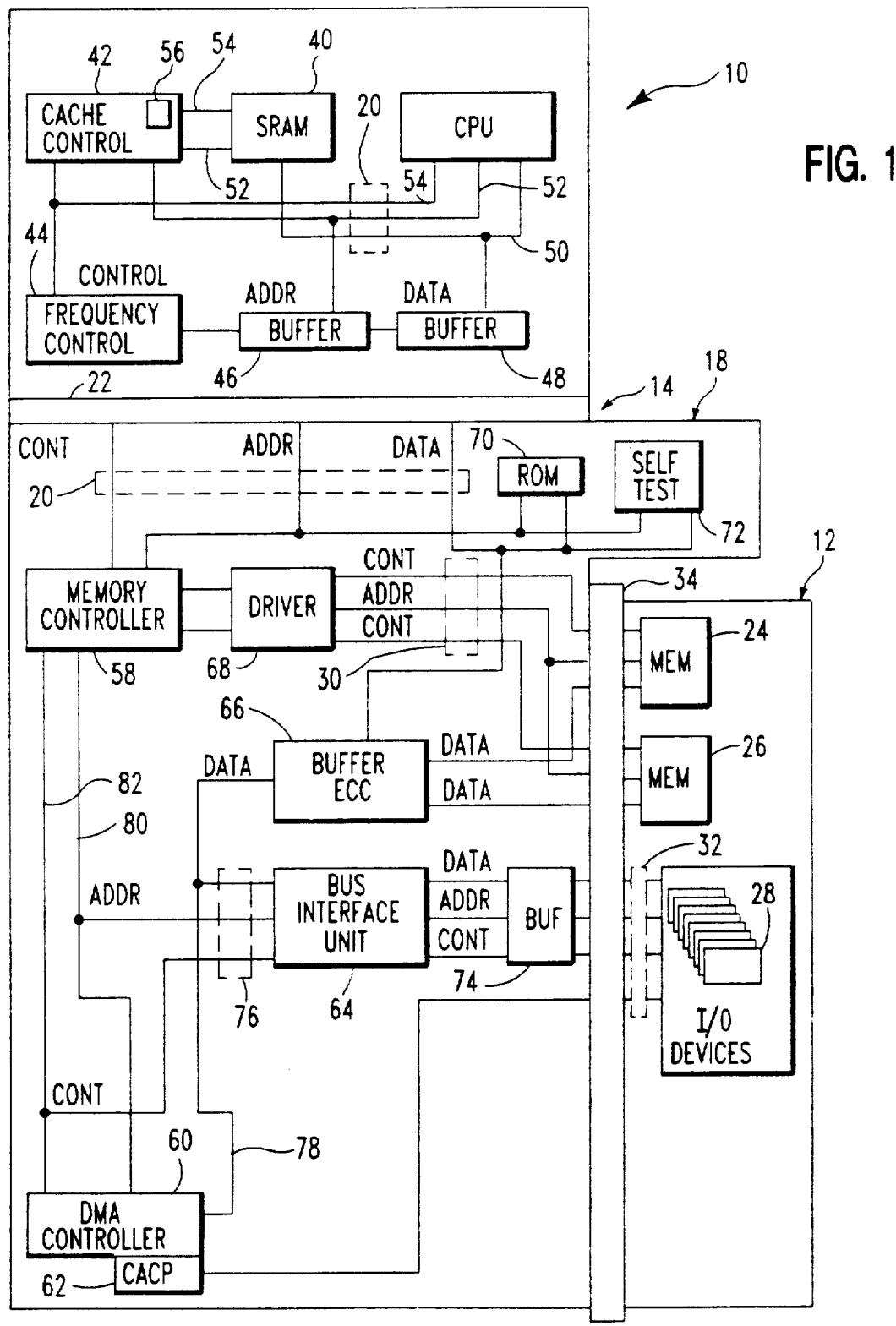
FIG. 1 is a schematic block diagram of a computer system incorporating a bus interface unit constructed according to the principles of the present invention.

Referring first to FIG. 1, a computer system shown generally at 10 comprises system board 12 and processor complex 14. Processor complex includes processor portion 16 and base portion 18 connected at processor local bus 20 via local bus connector 22. Processor portion 16 operates at 50 MHz and base portion 18 operates at 40 MHz.

System board 12 includes interleaved system memories 24 and 26 and input/output (I/O) devices 28. Communications between memories 24 and 26 and processor complex 14 are handled by memory bus 30, and communications between I/O devices 28 and processor complex 14 are carried by I/O bus 32. Communications between I/O devices and memories 24 and 26 are handled by I/O bus 32, system bus 76 and memory bus 30. I/O bus 32 may conform to MICRO CHANNEL ® computer architecture. Memory bus 30 and I/O bus 32 are connected to processor complex base portion 18 via processor complex connector 34. I/O devices such as memory expansion devices may be connected to the computer system 10 via I/O bus 32. System board 12 may also include conventional video circuitry, timing circuitry, keyboard control circuitry and interrupt circuitry (none of which are shown) which may be used by computer system 10 during normal operation.

Processor portion 16 of processor complex 14 includes central processing unit (CPU) 38 which, in the preferred embodiment, is a 32-bit microprocessor available from Intel, Inc. under the trade designation i486. Processor portion 16 also includes static random access memory (SRAM) 40, cache control module 42, frequency control module 44, address buffer 46 and data buffer 48. Local bus 20 comprises data information path 50, address information path 52 and control information path 54. Data information paths 50 are provided between CPU 38, SRAM 40 and data buffer 48. Address information paths 52 are provided between CPU 38, cache control module 42 and address buffer 46. Control information paths 54 are provided between CPU 38, cache control module 42 and frequency control module 44. Additionally, address and control information paths are provided between cache control module 42 and SRAM 40.

SRAM 40 provides a cache function by storing in short term memory information from either system memories 24 or 26 or from expansion memory which is located on an I/O device 28. Cache control module 42 incorporates random access memory (RAM) 56 which stores address locations of memories 24 and 26. CPU 38 may access information cached in SRAM 40 directly over the local bus 20. Frequency control module 44 synchronizes operation of the 50 Mhz processor portion 16 with the 40 MhZ base portion 18 and also controls the operation of buffers 46 and 48. Accordingly, frequency control module 44 determines the times at which information is captured by buffers 46 and 48 or the times at which information that is stored in these buffers is overwritten. Buffers 46 and 48 are configured to allow two writes from memories 24 and 26 to be stored simultaneously therein. Buffers 46 and 48 are bi-directional, i.e., they are capable of latching information which is provided by the CPU 38 and information which is provided to the CPU. Because buffers 46 and 48 are bi-directional, processor portion 16 of the processor complex 14 may be replaced or upgraded while maintaining a standard base portion 18.

Base portion 18 includes memory controller 58, direct memory access (DMA) controller 60, central arbitration control point (CACP) circuit 62, bus interface unit 64 and buffer/error correction code (ECC) circuit 66. Base portion 18 also includes driver circuit 68, read only memory (ROM) 70, self test circuit 72 and buffer 74. System bus 76 comprises a data information path 78, and address information path 80 and a control information path 82. The data information path connects buffer 74 with bus interface unit 64; bus interface unit 64 with DMA controller 60 and buffer/ECC circuit 66; and buffer/ECC circuit 66 with system memories 24 and 26. The address information path and the control information path each connect memory controller 58 with DMA controller 60 and bus interface unit 64; and bus interface unit 64 with buffer 74.

Memory controller 58 resides on both CPU local bus 20 and system bus 76, and provides the CPU 38, the DMA controller 60 or bus interface unit 64 (on behalf of an I/O device 28) with access to system memories 24 and 26 via memory bus 30. The memory controller 58 initiates system memory cycles to system memories 24 and 26 over the memory bus 30. During a system memory cycle, either the CPU 38, the DMA controller 60 or bus interface unit 64 (on behalf of an I/O device 28) has access to system memories 24 and 26 via memory controller 58. The CPU 38 communicates to system memory via local bus 20, memory controller 58 and memory bus 30, while the DMA controller 60 or bus interface unit 64 (on behalf of an I/O device 28) access system memory via system bus 76, memory controller 58 and memory bus 30.

For CPU 38 to I/O bus 32 read or write cycles, address information is checked against system memory address boundaries. If the address information corresponds to an I/O expansion memory address or I/O port address, then memory controller 58 initiates an I/O memory cycle or I/O port cycle with an I/O device 28 (via bus interface unit 64) over the I/O bus 32. During a CPU to I/O memory cycle or I/O port cycle, the address which is provided to memory controller 58 is transmitted from system bus 76 to I/O bus 32 via bus interface unit 64 which resides intermediate these two buses. The I/O device 28 which includes the expansion memory to which the address corresponds receives the memory address from I/O bus 32. DMA controller 60 and the bus interface unit 64 control the interchange of information between system memories 24 and 26 and expansion memory which is incorporated into an I/O device 28. DMA controller 60 also provides three functions on behalf of processor complex 14. First, the DMA controller 60 utilizes a small computer subsystem control block (SCB) architecture to configure DMA channels, thus avoiding the necessity of using programmed I/O to configure the DMA channels. Second, DMA controller provides a buffering function to optimize transfers between slow memory expansion devices and the typically faster system memory. Third, DMA controller 60 provides an eight channel, 32-bit, direct system memory access function. When providing the direct system memory access function, DMA controller 60 may function in either of two modes. In a first mode, DMA controller 60 functions in a programmed I/O mode in which the DMA controller is functionally a slave to the CPU 38. In a second mode, DMA controller 60 itself functions as a system bus master, in which DMA controller 60 arbitrates for and controls I/O bus 32. During this second mode, DMA controller 60 uses a first in, first out (FIFO) register circuit.

CACP circuit 62 functions as the arbiter for the DMA controller, I/O device bus controllers and the CPU (if accessing I/O devices). CACP circuit 62 receives arbitration control signals from DMA controller 60, memory controller 58 as well as from I/O devices, and determines which devices may control the I/O bus 32 and the length of time during which the particular device will retain control of the I/O bus.

Driver circuit 68 provides control information and address information from memory controller 58 to system memories 24 and 26. Driver circuit 68 drives this information based upon the number of single in-line memory modules (SIMMs) which are used to construct system memories 24 and 26. Thus, driver circuit 68 varies the signal intensity of the control and address information which is provided to system memories 24 and 26 based upon the size of these memories.

Buffer circuit 74 provides amplification and isolation between processor complex base portion 18 and system board 12. Buffer circuit 74 utilizes buffers which permit the capture of boundary information between I/O bus 32 and bus interface unit 64 in real time. Accordingly, if computer system 10 experiences a failure condition, buffer circuit 74 may be accessed by a computer repair person to determine the information which was present at connector 34 upon failure of the system.

ROM 70 configures the system 10 upon power-up by initially placing in system memory data from expansion memory. Self test circuit 72, which is connected to a plurality of locations within base portion 18, provides a plurality of self test features. Self test circuit 72 accesses buffer circuit 74 to determine if failure conditions exist, and also tests the other major components of base portion 18 upon power-up of the system 10 to determine whether the system is ready for operation.

Figure 2:
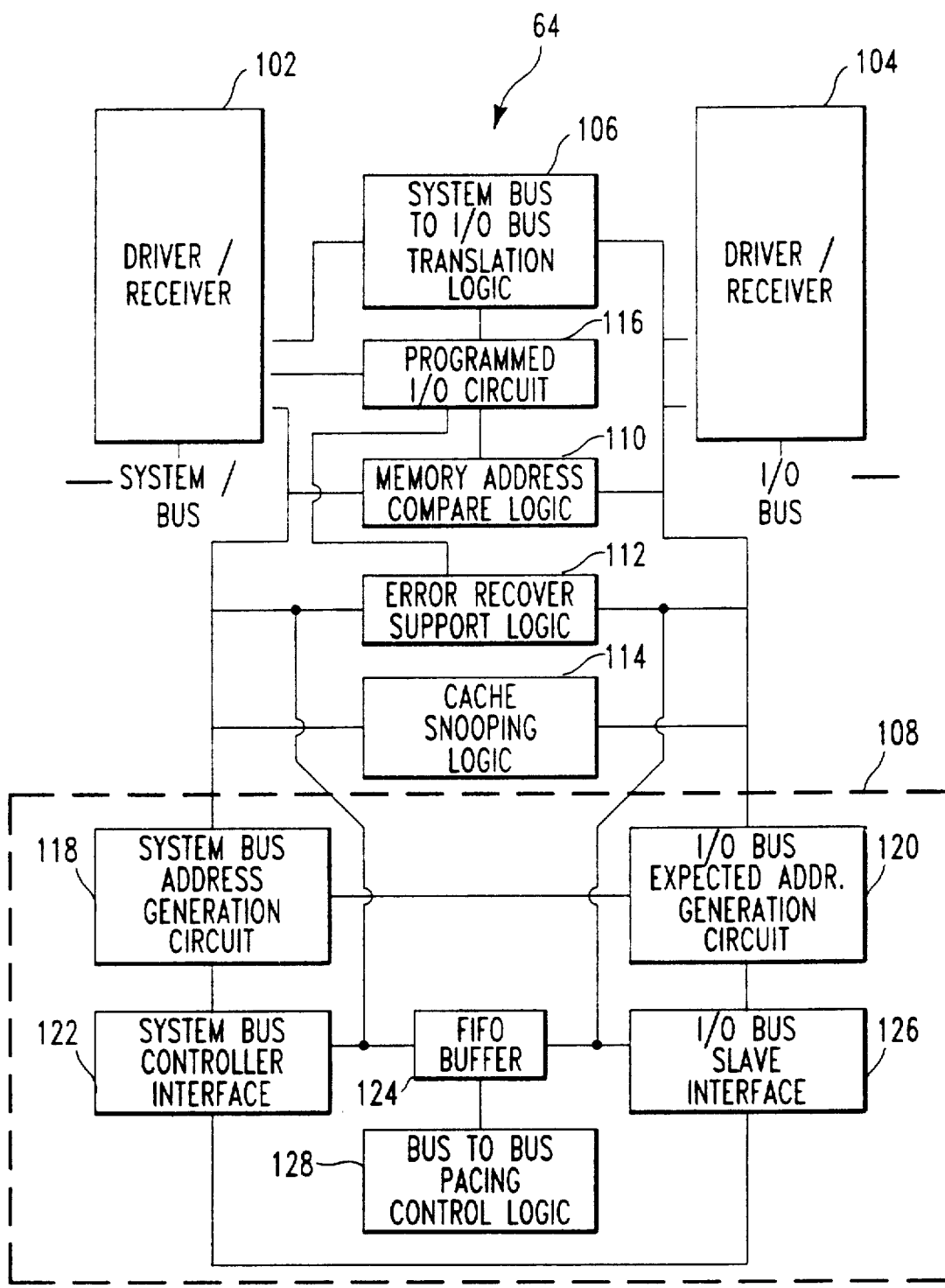
FIG. 2 is a schematic block diagram of the bus interface unit of the computer system of FIG. 1.

Referring to FIG. 2, a schematic block diagram of the bus interface unit 64 of the system of FIG. 1 is shown. Bus interface unit 64 provides the basis for implementation of the present invention by providing a bi-directional high speed interface between system bus 76 and I/O bus 32.

Bus interface unit 64 includes system bus driver/receiver circuit 102, I/O bus driver/receiver circuit 104 and control logic circuits electrically connected therebetween. Driver/receiver circuit 102 includes steering logic which directs signals received from the system bus 76 to the appropriate bus interface unit control logic circuit and receives signals from the bus interface unit control logic circuits and directs the signals to the system bus 76. I/O bus driver/receiver circuit 104 includes steering logic which directs signals received from the I/O bus 32 to the appropriate bus interface unit control logic circuit and receives signals from the bus interface unit control logic circuits and directs the signals to the I/O bus 32.

The bus interface unit control logic circuits include system bus to I/O bus translation logic 106, I/O bus to system bus translation logic 108, memory address compare logic 110, error recovery support logic 112, and cache snooping logic 114. Programmed I/O circuit 116 is also electrically coupled to system driver/receiver circuit 102.

The system bus to I/O bus translation logic 106 provides the means required for the DMA controller 60 or the memory controller 58 (on behalf of CPU 38) to act as a system bus controller to access the I/O bus 32 and thereby communicate with I/O devices 28 acting as slave devices on the I/O bus. Translation logic 106 translates the control, address and data lines of the system bus 76 into similar lines on the I/O bus 32. Most control signals and all address signals flow from the system bus 76 to the I/O bus 32 while data information flow is bi-directional. The logic which acts as system bus slave monitors the system bus 76 and detects cycles which are intended for the I/O bus 32. Upon detection of such a cycle, the system bus slave translates the timing of signals on the system bus to I/O bus timing, initiates the cycle on the I/O bus 32, waits for the cycle to be completed, and terminates the cycle on the system bus 76.

The I/O bus to system bus translation logic 108 comprises system bus address generation circuit 118, I/O bus expected address generation circuit 120, system bus controller interface 122, FIFO buffer 124, I/O bus slave interface 126 and bus to bus pacing control logic 128. System bus controller interface 122 supports a high performance 32 bit (4 byte) i486 burst protocol operating at 40 MHZ. Data transfers of four, eight and sixteen bytes in burst mode and one to four bytes in no-burst mode are provided. I/O bus slave interface 126 monitors the I/O bus 32 for operations destined for slave devices on the system bus 76 and ignores those operations destined for the I/O bus 32. All cycles picked up by the I/O bus slave interface 126 are passed on to the FIFO buffer 124 and the system bus controller interface 122.

The I/O bus to system bus translation logic 108 provides the means required for an I/O device 28 to act as an I/O bus controller to access system bus 76 and thereby read or write to system memories 24 and 26. In either of these operations, an I/O device controls the I/O bus. The asynchronous I/O bus interface 126, operating at the speed of the I/O device, permits the bus interface unit 64 to act as a slave to the I/O device controller on the I/O bus 32 to decode the memory address and determine that the read or write cycle is destined for system memories 24 or 26. Simultaneously, the system bus controller interface 122 permits the bus interface unit 64 to act as a controller on the system bus 74. The memory controller 58 (FIG. 2) acts as a slave to the bus interface unit 64, and either provides the interface 64 with data read from system memory or writes data to system memory. The reads and writes to system memory are accomplished through the FIFO buffer 124, a block diagram of which is illustrated in FIG. 3.

Figure 3:
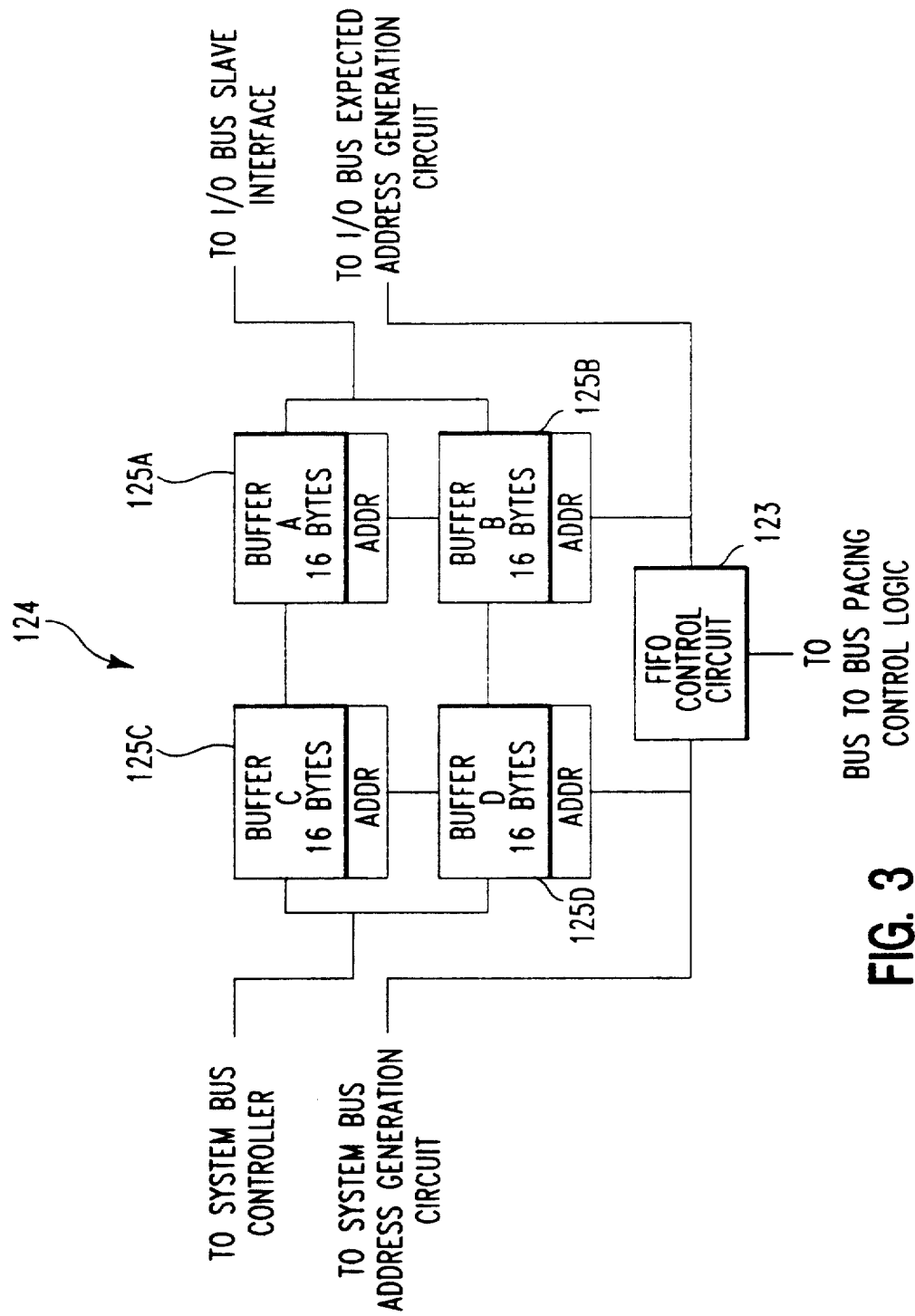
FIG. 3 is a schematic block diagram of the FIFO buffer of the bus interface unit of FIG. 2.

As shown in FIG. 3, FIFO buffer 124 is a dual ported, asynchronous, bi-directional storage unit which provides temporary storage of data information between the system and I/O buses 76, 32. FIFO buffer 124 comprises four sixteen-byte buffers 125A-125D and FIFO control circuit 123. The four buffers 125A-125D buffer data to and from I/O bus controllers and system bus slaves, thereby allowing simultaneous operation of the I/O bus 32 and the system bus 76. The FIFO buffer 124 is physically organized as two thirty-two byte buffers (125A/125B and 125C/125D). The system bus controller interface 122 and the I/O bus slave interface 126 each control one thirty-two byte buffer while the other thirty-two byte buffer operates transparent to them. Both of the thirty-two byte buffers are utilized for read and write operations.

Each FIFO 124A, 125B, 125C, 125D has an address register section either physically associated with the respective FIFO, or logically associated therewith. As data is transferred from the I/O bus 32 to FIFO 125A, the data will be accumulated until the 16 byte buffer is filled with 16 bytes of data, provided that the addresses are contiguous. If a non-contiguous address is detected by the address action, the FIFO 125A will transfer the stored data to FIFO 125C, and at the same time FIFO 125B will start to receive this data from the new non-contiguous address. FIFO 125B will continue just as FIFO 125A did until it is filled with 16 bytes of data, or another non-contiguous address is detected. FIFO 125B will then transfer the stored data to FIFO 125D, and FIFO 125A again starts to store data; thus, it is possible to store up to four 16 byte blocks of non-contiguous address data.

Further, by having two 32 byte buffers in parallel the reading and writing of data can be toggled between them thus giving an essentially continuous read or write function.

Move over, by splitting the 32 byte buffers into two 16 bytes buffer sections which are coupled to other I/O bus 32 or system bus 26, the number of storage buffers can be increased with minimal impact on the performance of the FIFO as related to the capacitive loading on signals clocking data in or out of the storage registers. This is accomplished because for every two buffers added (in parallel) only half the capacitive loading is added to the loading of clock signals on each bus.

Additionally, by having two 16 byte buffers in series in each leg, once one of the 16 byte buffers is filled with data, such as in a read operation, the data can be transferred to the other 16 byte buffers in series therewith, while the other parallel leg is accumulating data. Hence, there is no time lost in either accumulating data, or transferring the data from one bus to the other.

The logic for controlling the operation of the FIFO 124 is supplied by FIFO Control Circuit 123.

A particular I/O device 28 may write to system memories 24 or 26 via I/O bus in bandwidths of either 1, 2 or 4 bytes (i.e., 8, 16 or 32 bits). During writes to system memory by an I/O device 28, the first transfer of write data is initially stored in the FIFO buffer 125A or 125B. The I/O bus expected address generation circuit 120 calculates the next expected, or contiguous, address. The next contiguous address is checked against the subsequent I/O address to verify if the subsequent transfers are contiguous or not. If contiguous, the second byte or bytes of write data is sent to the same FIFO buffer 125A or 125B. The FIFO receives data at asynchronous speeds of up to 40 megabytes per second from the I/O bus 32.

This process continues until either buffer 125A or 125B is full with a 16-byte packet of information or a non-contiguous address is detected. On the next clock cycle, assuming that buffer 125A is full, the data in buffer 125A is transferred to buffer 125C. Similarly, when buffer 125B is full, all of its contents are transferred to buffer 125D in a single clock cycle. The data stored in the buffers 125C and 125D is then written to system memory via an i486 burst transfer at the system bus operational speed. The operation of FIFO buffer 124 during a write to system memory by an I/O device is thus continuous, alternating between buffers 125A and 125B, with each emptying into adjacent buffer 125C or 125D, respectively, while the other is receiving data to be written to system memory. The FIFO buffer 124, then, optimizes the speed of data writes to system memory by (i) anticipating the address of the next likely byte of data to be written into memory and (ii) accommodating the maximum speed of write data from the FIFO buffer to system memory via the system bus 76.

During reads of data from system memory to an I/O device 28, FIFO buffer 124 operates differently. The system bus address generation circuit 118 uses the initial read address to generate subsequent read addresses of read data and accumulate data in buffer 125C or 125D. Because the system bus supports transfers in bandwidths of 16 bytes wide, the system bus controller interface 122 may prefetch 16-byte packets of contiguous data and store it in buffers 125C or 125D without the I/O bus 32 actually providing subsequent addresses, thus reducing latency between transfers. When buffer 125C is full of prefetched data, it transfers its contents to buffer 125A in one clock cycle. Buffer 125D similarly empties into buffer 125B when full. The data in buffers 125A and 125B may then be read by a particular I/O device controller in bandwidths of 1, 2 or 4 bytes. In this way, system bus address generation circuit 118 functions as an increment counter until instructed to by the I/O controller device to stop prefetching data.

Bus to bus pacing control logic 128 creates a faster access to system memory for high speed I/O devices. The bus to bus pacing control logic 128 overrides the normal memory controller arbitration scheme of system 10 by allowing an I/O device in control of the I/O bus 32 uninterrupted access to system memory during transfers of data by faster devices which require multiple cycles, rather than alternating access to the memory controller 58 between the I/O device and the CPU. Thus, even if a local device such as the CPU has a pending request for control of the memory bus during a multiple cycle transmission by an I/O device, the bus to bus pacing control logic 128 will grant the I/O device continued control of the memory bus.

The programmed I/O circuit 116 is the portion of the bus interface unit 64 which contains all of the registers which are programmable within the bus interface unit 64. The registers have bits associated therewith to determine whether a particular register is active or inactive. These registers define, inter alia, the system memory and expansion memory address ranges to which the bus interface unit 64 will respond, the expansion memory addresses which are either cacheable or noncacheable, the system memory or cache address ranges, and whether or not parity or error checking is supported by the bus interface unit. Accordingly, programmed I/O circuit 116 identifies for the bus interface unit 64 the environment in which it resides, and the options to which it is configured. The registers in programmed I/O circuit 116 cannot be programmed directly over the I/O bus 32. Hence, in order to program the system 10, the user must have access to an I/O device which may communicate over the system bus to the programmed I/O circuit 116 at the CPU level.

Memory address compare logic 110 determines if a memory address corresponds to system memory or corresponds to expansion memory which is located on I/O device 28 coupled to the I/O bus 32. Because the system memory as well as the expansion memory may be in non-contiguous blocks of addresses, memory address compare logic 110 includes a plurality of comparators which are loaded with boundary information from registers in the programmed I/O circuit 116 to indicate which boundaries correspond to which memory. After a particular memory address is compared with the boundary information by the memory address compare logic, the bus interface unit is prepared to react accordingly. For example, if an I/O device controlling the I/O bus 32 is reading or writing to expansion memory, the bus interface circuit need not pass that address to the memory controller 58, thereby saving time and memory bandwidth.

Error recovery support logic 112 permits the system 10 to continue operations even if a data parity error is detected. On any read or write access by an I/O device 28 to system memories 24 or 26, parity of the data is checked. Support logic 112 interacts with a register in the programmed I/O circuit 116 for capturing the address and the time of the detected parity error. The contents of this register may then be acted upon by appropriate system software. For example, the CPU 38 may be programmed for a high level interrupt to pull the address out of the register at any time a parity error is detected. The CPU may then decide, based on the system software instructions, whether to continue system operations or merely terminate operation of the identified source of the parity error.

Cache snooping logic 114 permits the bus interface unit 64 to monitor the I/O bus 32 for any writes to expansion memory by an I/O device taking place over the I/O bus 32. The snooping logic first determines if the write to expansion memory occurred in expansion memory which is cacheable in SRAM 40. If it is not cacheable expansion memory, there is no danger of corrupt data being cached. If, however, a positive compare indicates that the write occurred in cacheable expansion memory, a cache invalidation cycle is initiated over the system bus 76. The CPU is thus instructed to invalidate the corresponding address in SRAM 40. Cache snooping logic 114 provides means to store the address of a positive compare so that snooping of the I/O bus may continue immediately after detection of the first positive compare, thereby permitting continuous monitoring of the I/O bus 32.

The present invention relates generally to the bus interface unit 64 described above and more particularly to the system bus to I/O bus translation logic 106 which is contained within the bus interface unit 64 residing intermediate the system bus 76 and the input/output bus 32 in the computer system 10. The translation logic 106 is implemented by algorithms which are built into the hardware of the bus interface unit 64. The translation logic 106 in the bus interface unit 64 synchronizes operation of the system bus 76 and the I/O bus 32. Synchronization of the buses 32, 76 compensates for system bus devices and input/output devices which communicate to each other at different rates and over different data transfer bandwidths.

The translation logic 106 improves the performance of system bus 76 to I/O bus 32 transfers by optimizing and combining two cycle conditions without impeding system critical processes. The first condition occurs when a fast system device is writing data to a slower I/O device 28. System devices such as the memory controller 58 (on behalf of the CPU 38) write data over the system bus 76 at faster rates than I/O devices can accept the data. Thus, the present invention provides a buffer wherein data written from the faster system device to the slower I/O device may be temporarily stored, as well as logic to terminate the system bus cycle. In this manner, write data which has been posted in the buffer frees the system bus 76 for subsequent operations even though all of the write data has not yet been written to the I/O device 28. This operation of the translation logic 106 in response to the first condition is hereinafter referred to as a posted write cycle.

The second condition under which the translation logic 106 operates occurs when a system device such as the memory controller 58 (on behalf of the CPU 38) has control of the system bus 76 and desires to initiate a read or write cycle destined for an I/O device 28 acting as a slave on the I/O bus 32, and the data bus width of the system device is greater than the data bus width of the I/O device 28. (Typically, the data bus width of the system device is 32-bits, which is supported on both the system bus side and the I/O bus side of the bus interface unit 64, and the data bus width of the I/O device is 8-bits, 16-bits, or 32-bits.) In the case of a 16-bit access to an 8-bit slave, or a 32-bit access to an 8-bit or 16-bit I/O slave, as a result of the mismatched data bus widths, the memory controller 58 communicating over the system bus 76 to an 8-bit or 16-bit I/O device 32 on the I/O bus must wait for the I/O device to receive a complete read or write request before the memory controller 58 may relinquish control of the system bus 76. Because the CPU can transfer data over the system bus 76 in a 32-bit data bus width, if the data is destined to be read by or written to a 8-bit I/O device, the 32-bit read or write is temporarily stored in a buffer (not shown) in translation logic 106. The buffer in the preferred embodiment has the capacity to hold thirty-two bits of data and address. The translation logic 106 provides means to convert single 32-bit read and write cycles initiated on the system bus 76 to four 8-bit or two 16-bit cycles which may be handled by an I/O device 28. This operation of the translation logic 106 in response to the second condition is hereinafter referred to as a conversion cycle.

Figure 4:
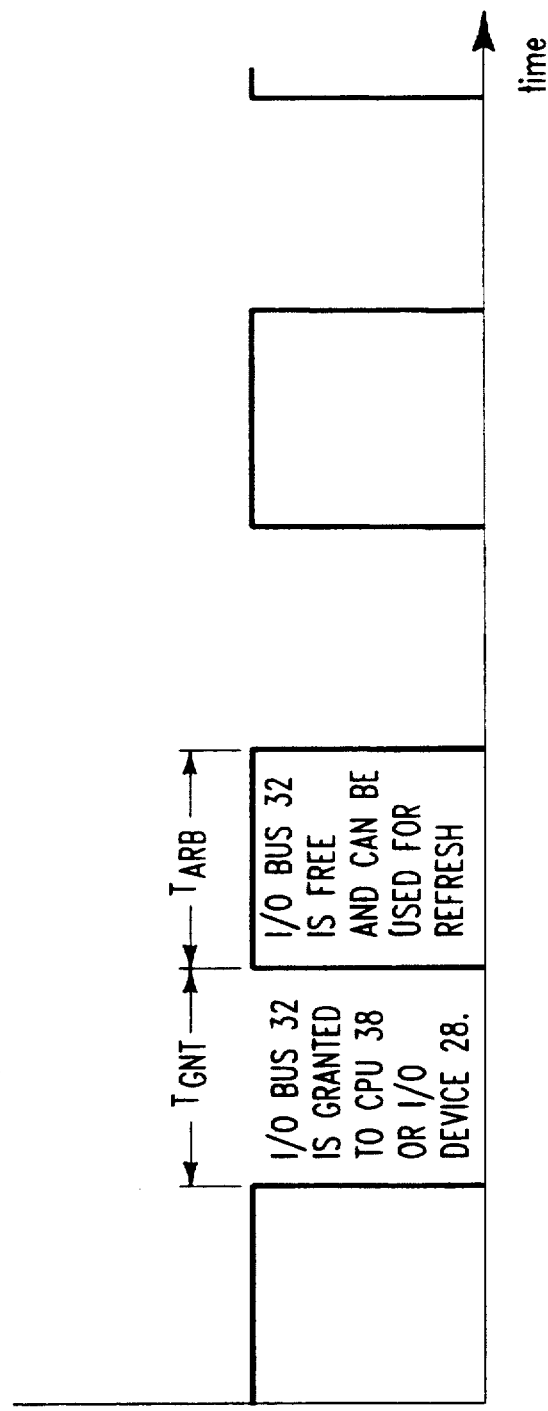
FIG. 4 is a timing diagram illustrating the operational cycles of the CACP circuit of FIG. 1.

The translation logic 106 affects the operation of the CACP circuit 62 which alternates between arbitration cycles $T_{ARB}$ and grant cycles $T_{GNT}$ (see FIG. 4). During arbitration cycles $T_{ARB}$, CACP circuit 62 arbitrates between I/O devices 28 and the CPU 38 to determine which of the I/O devices 28 or the CPU 38 should be granted control of the I/O bus 32. During grant cycles $T_{GNT}$, CACP circuit 62 grants control of the I/O bus 32, and extends control of said system bus 28, to one of the I/O devices 28 or the CPU 38. The buffering of data in both posted write and conversion cycles precludes the CACP circuit 62 from granting I/O bus 32 to a new I/O device intermediate successive I/O cycles.

Figure 5:
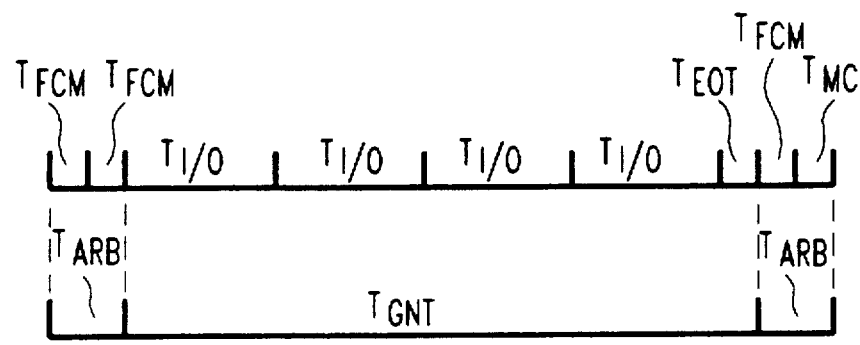
FIGS. 5 and 6 are timing diagrams resulting from the operation of the translation logic of FIG. 2.

The operation of the conversion cycles and posted write cycles will now be explained in greater detail. FIG. 5 shows a timing diagram resulting from the implementation of conversion cycles by translation logic 106 in the bus interface unit 64. The timing diagram of FIG. 5 relates to a 32-bit read or write transfer by the memory controller 58 (on behalf of the CPU) to an 8-bit I/O device 28. Of course, the principles of the present invention also apply to 16-bit I/O devices. As shown in the top line of FIG. 5, the entire transfer proceeds as follows. In the computer system 10, when the CPU 38 initiates a read or write cycle to an I/O device, the CPU must communicate through the frequency control module 44, the memory controller 58 and the bus interface unit 64. The frequency control module 44 and the memory controller 58 each cause a delay of at least one clock cycle ($T_{FCM}$ and $T_{MC}$, respectively, in FIG. 5) in the read or write cycle. These delays also occur at the end of the cycle, along with the end-of-transfer delay $T_{EOT}$ which adds an additional one or two clock periods to the cycle. Intermediate these delays at the beginning and the end of the read or write cycle, the translation logic 106 of the bus interface unit 64 converts the 32-bit read or write data from the memory controller 58 into four back-to-back I/O read or write cycles ($T_{I/O}$).

The translation logic 106 of the bus interface unit 64 thereby performs conversion cycles on behalf of the CPU 38. In this manner, the CPU 38 need not perform four 8-bit data transfer cycles each having the $T_{FCM}$ and $T_{MC}$ delays associated therewith. As a result, as shown in the bottom line of FIG. 5, the time during which the CACP circuit 62 is in a grant mode and during which no other activities may occur on the I/O bus 32 ($T_{GNT}$) is decreased. If the CPU 38 were required to perform its own conversion cycles, there would be $T_{FCM}$ and $T_{MC}$ delays after each $T_{I/O}$ period, thereby increasing the time that the CPU must control the bus.

In I/O bus specifications, I/O slaves are limited in the amount of time they are allowed to delay an I/O cycle. This is so as not to impede timing critical processes on the I/O bus or system bus such as refresh of dynamic system memory. Typically, in the preferred embodiment, 3.5 μsec is the maximum time allowed for an I/O slave to delay a read or write cycle ($T_{I/O}$). Buffering four of these cycles back-to-back will require at most 14 μsec to complete. Arbitration by the CACP circuit occurs during the delay periods $T_{FCM}$ and $T_{MC}$. During arbitration, the DMA controller 60 can refresh system memories 24 and 26. In the preferred embodiment, system memories 24 and 26 have refresh intervals of 15.6 μsec. If a refresh does not occur within 3 refresh intervals (46.3 μsec) of the previous refresh, system timeout and dynamic RAM memory loss will occur. However, a device may safely own the I/O bus 32 for a maximum of 2 refresh intervals (31.2 μsec) since it is not known when the previous refresh occurred. Therefore, the maximum 14 μsec period intermediate subsequent arbitration periods due to conversion cycles will not adversely affect refresh operations.

Figure 6:
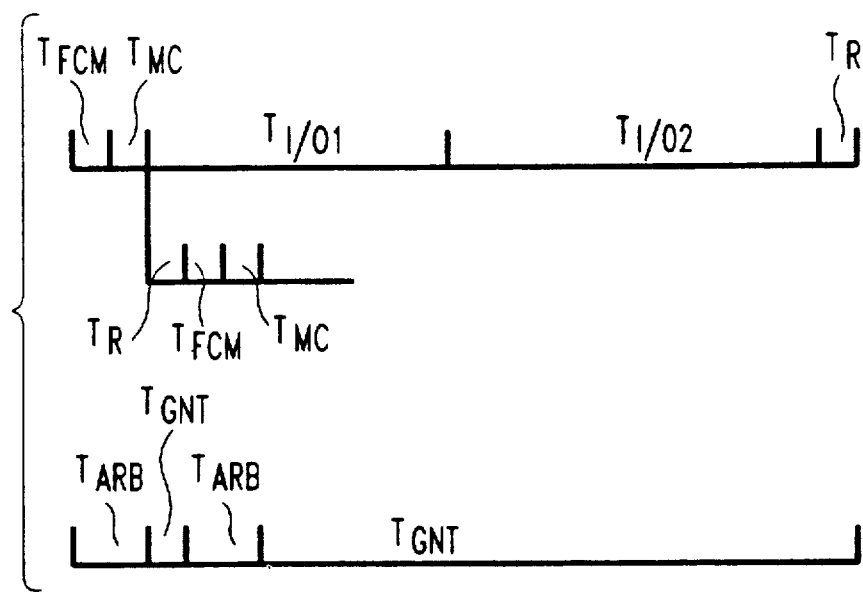

Regarding posted write cycles, the buffer in translation logic 106 also provides the means to buffer 32-bit write data prior to its being written to an I/O device 28. Such operation frees the system bus for activity not related to the I/O bus 32, such as CPU memory cycles or cache cycles. Posted write cycles, however, even provide a time savings if the next CPU operation is another write to an I/O device 28. FIG. 6 shows a timing diagram resulting from successive write operations by the CPU 38 to an I/O device 28. As shown by the top line of FIG. 6, the write transfer begins with delays $T_{FCM}$ and $T_{MC}$ caused by the delay introduced by the frequency control module 44 ($T_{FCM}$) and the memory controller 58 ($T_{MC}$). $T_{I/O}$ represents the first write cycle of data from the CPU 38 to an I/O device 28 over the I/O bus 32 which is posted (buffered) in the translation logic 106. $T_{I/O2}$ represents the second write cycle of write data over the I/O bus 32. $T_R$ is a ready signal provided to the CPU upon completion of the write activity on the I/O bus 32.

Because the first write cycle data is posted, a $T_R$ ready signal may be provided to the CPU immediately upon posting. Thus, the delays $T_{FCM}$ and $T_{MC}$ inherent with CPU communications through the frequency control module 44 and the memory controller 58 may occur over the system bus 76 simultaneously as the write cycle is completed over the I/O bus 32. The second write cycle $T_{I/O2}$ may proceed over the I/O bus immediately following the first write cycle $T_{I/O1}$. If the first write cycle data were not posted, the time required for the ready signal Tr and the delays $T_{FCM}$ and $T_{MC}$ would have to occur intermediate the first and second write cycles $T_{I/O1}$ and $T_{I/O2}$. This time would not be masked under the first write cycle $T_{I/O1}$ as shown in the top line of FIG. 6, and would result in longer completion times to complete subsequent CPU to I/O device write cycles. Additionally, $T_{I/O1}$ and $T_{I/O2}$ can be conversion cycles as defined by the conditions of FIG. 7.

Posted write cycles and conversion cycles may occur simultaneously in the preferred embodiment of the present invention. The translation logic 106 is used as a buffer for both conversion and posted write operations. However, the conditions listed in FIG. 7 must be imposed on the number of buffered cycles so as not to cause a system timeout. Refresh cycles occur only during a CACP arbitration mode, therefore, due to system memory requirements, and because a I/O devices 28 or CPU 38 may gain control of the bus just before the CACP is required to run a refresh cycle, the time between successive arbitration modes must not exceed 31.2 μsec. As shown in FIGS. 5 and 6, the CACP circuit 62 does not enter arbitration mode intermediate subsequent I/O cycles of buffered data because the I/O bus activity is continuous and not interrupted by the handshaking delays $T_{FCM}$ and $T_{MC}$. Hence, the number of buffered 3.5 μsec I/O cycles must be limited to ensure that 31.2 μsec does not elapse intermediate successive arbitration cycles.

The handshaking delays occurring at the beginning of a posted write/conversion cycle ($T_{FCM}$, $T_{MC}$) account for approximately 0.2 μsec. By buffering a maximum of six I/O cycles, under the conditions shown in FIG. 7, CACP arbitration cycles will occur at least every [(6×3.5 μsec)+(0.2 μsec)=21.2 μsec]. Such a limit of six buffered I/O cycles allows for a minimum of 10.0 μsec (31.2 μsec−21.2 μsec) between the end of the last I/O cycle and the time at which a system timeout would occur due to failure to refresh system memory. This 10.0 μsec minimum provides ample time for the DMA controller to enter arbitration mode, gain control of the system bus, and begin a refresh cycle.

Accordingly, the preferred embodiment of a bus control logic system for computers having dual bus architecture has been described. With the foregoing description in mind, however, it is understood this description is made only by way of example, that the invention is not limited to the particular embodiments described herein, and that various rearrangements, modifications, and substitutions may be implemented without departing from the true spirit of the invention as hereinafter claimed.

We claim:

1. A computer system, comprising:
    system memory and a memory controller for controlling access thereto, said system memory and said memory controller connected by a memory bus;
    a central processing unit electrically connected with said memory controller;
    a bus interface unit electrically connected to said memory controller by a system bus and electrically connected to a plurality of I/O devices by an I/O bus, said I/O devices and said central processing unit operating at different speeds and transferring data at different bandwidths over said I/O bus and said system bus, respectively, said bus interface unit including a buffer circuit wherein data read from an I/O device or written to an I/O device by said central processing unit over said system bus and said I/O bus via said bus interface unit is temporarily stored;
    a central arbitration control point residing on said system bus for serially performing (i) arbitration cycles wherein said central arbitration control point arbitrates, between I/O devices having requests pending for access to said I/O bus, to determine which of said I/O devices should be granted control of said I/O bus and (ii) grant cycles wherein said central arbitration control point grants control of said I/O bus to one of said I/O devices;
    said bus interface unit also including posting logic for (i) temporarily storing in said buffer circuit during one system bus cycle write data in excess of that which may be written to an I/O device over said I/O bus in one I/O bus cycle, (ii) completing transfer of write data from said buffer circuit to a first I/O device over said I/O bus in at least two I/O bus cycles while releasing control of said system bus for further data processing during the first of said at least two I/O bus cycles, and (iii) preventing said central arbitration control point from granting control of said I/O bus to a second I/O device during said transfer of write data over said I/O bus to said first I/O device.

2. The computer system of claim 1, wherein said posting logic is implemented by algorithms which are built into hardware in said bus interface unit.

3. The system of claim 1, wherein said transfer of write data is completed in four I/O bus cycles.

4. The system of claim 1, wherein said system bus transfers data at a bandwidth of 32 bits and said I/O devices transfer data over said I/O bus at bandwidths up to 16 bits.

5. The system of claim 1, wherein said bus interface unit further includes conversion logic for (i) temporarily storing in said buffer circuit during at least two I/O bus cycles read data to be read by a system device residing on said system bus from one of said I/O devices, (ii) converting said stored read data into a contiguous string of read data, which may be read by said system device in a single system bus cycle, and (iii) completing transfer of said read data from said buffer circuit to said system device in said single system bus cycle while releasing control of said I/O bus by said one of said I/O devices.

6. The system of claim 5, wherein said read data is temporarily stored for four I/O bus cycles.

7. The system of claim 5, wherein said system device transfers data at a bandwidth of 32 bits over said system bus and said one of said I/O devices transfer data over said I/O bus at bandwidths up to 16 bits.

8. The computer system of claim 5, wherein said system bus supports burst transfers of read or write data between said bus interface unit and said system memory in data transfers of up to sixteen bytes, and wherein said I/O bus supports transfers of read or write data between said I/O device and said bus interface unit in data bus widths of one, two or four bytes.

9. A method of transferring data over a system bus and an I/O bus in a dual bus computer system, said system comprising at least one system device attached to said system bus and at least one I/O device attached to said I/O bus, said system bus and said I/O bus connected by a bus interface unit including a buffer circuit, said method comprising the steps of:
    storing in said buffer circuit during one system bus cycle write data in excess of that which may be written to an I/O device in one I/O bus cycle, (ii) completing transfer of write data from said buffer circuit to a first I/O device over said I/O bus in at least two I/O bus cycles while releasing control of said system bus for further data processing during the first of said at least two I/O bus cycles, and (iii) preventing a second I/O device from obtaining control of said I/O bus during said transfer of write data over said I/O bus to said first I/O device, by inhibiting a central arbitration control point from granting access to said I/O bus to said second I/O device.

10. The method of claim 9, wherein said transfer of write data is completed in four I/O bus cycles.

11. The method of claim 9, wherein said system bus transfers data at a bandwidth of 32 bits over said system bus and said I/O devices transfer data over said I/O bus at bandwidths up to 16 bits.

12. The method of claim 9, further comprising the steps of: (i) temporarily storing in said buffer circuit during at least two I/O bus cycles read data to be read by a first system device from one of said I/O devices, (ii) converting said stored read data into a contiguous string of data which may be read by said first system device in a single system bus cycle, and (iii) completing transfer of said read data from said buffer circuit to said first system device in said single system bus cycle while simultaneously releasing control of said I/O bus by said one of said I/O devices.

13. The method of claim 12, wherein said read data is temporarily stored for four I/O bus cycles.

14. The method of claim 12, wherein said system device transfers data at a bandwidth of 32 bits over said system bus and said one of said I/O devices transfer data over said I/O bus at bandwidths up to 16 bits.

* * * * *